United States Patent
Lacroix et al.

(10) Patent No.: US 7,406,316 B2
(45) Date of Patent: Jul. 29, 2008

(54) METHOD AND DEVICE FOR MANAGING RADIO LINK INTERRUPTION IN A RADIO COMMUNICATION SHADOW ZONE

(75) Inventors: Didier Lacroix, Chateaufort (FR); Antoine Soulie, Paris (FR)

(73) Assignee: Evolium S.A.S., Paris (FR)

( * ) Notice: Subject to any disclaimer, the term of this patent is extended or adjusted under 35 U.S.C. 154(b) by 0 days.

(21) Appl. No.: 10/529,912

(22) PCT Filed: Sep. 26, 2003

(86) PCT No.: PCT/FR03/02830

§ 371 (c)(1),
(2), (4) Date: Jun. 1, 2005

(87) PCT Pub. No.: WO2004/032553

PCT Pub. Date: Apr. 15, 2004

(65) Prior Publication Data

US 2005/0215257 A1 Sep. 29, 2005

(30) Foreign Application Priority Data

Oct. 3, 2002 (FR) .................................. 02 12242

(51) Int. Cl.
*H04Q 7/20* (2006.01)
*H04L 12/28* (2006.01)

(52) U.S. Cl. .................... 455/452.1; 455/445; 370/351

(58) Field of Classification Search ................. 455/450, 455/453, 522, 435.1, 436, 452.2, 455, 452.1, 455/403; 370/351; 714/752
See application file for complete search history.

(56) References Cited

U.S. PATENT DOCUMENTS

| 6,215,782 | B1 | 4/2001 | Buskens |
| 6,668,168 | B1 * | 12/2003 | Moulsey et al. ............. 455/434 |
| 2002/0082023 | A1 * | 6/2002 | Bark et al. .................. 455/453 |
| 2004/0162070 | A1 * | 8/2004 | Baral et al. ............. 455/435.1 |
| 2004/0202147 | A1 * | 10/2004 | Hakkinen et al. ........... 370/351 |
| 2005/0075124 | A1 * | 4/2005 | Willenegger et al. ........ 455/522 |
| 2005/0193309 | A1 * | 9/2005 | Grilli et al. ................. 714/752 |

FOREIGN PATENT DOCUMENTS

| EP | 1 124 395 A | 8/2001 |
| WO | WO 00/33595 A | 6/2000 |

* cited by examiner

*Primary Examiner*—Naghmeh Mehrpour
*Assistant Examiner*—Melody Mehrpour
(74) *Attorney, Agent, or Firm*—Sughrue Mion, PLLC

(57) ABSTRACT

The apparatus (D) is dedicated to managing momentarily radio link interruptions between mobile stations (MS-i) and at least one radio network controller (BSC) of a radio access network (RAN) of a communications network. The apparatus comprises firstly detector means (DM) capable of detecting a radio link interruption between a mobile station (MS-i) and a radio network controller (BSCn), and secondly control means (CM) capable, on an interruption being detected by the detector means (DM), of ordering the radio network controller (BSCn) to suspend the radio link and then to attempt reactivate the radio link in application of a selected timetable.

13 Claims, 1 Drawing Sheet

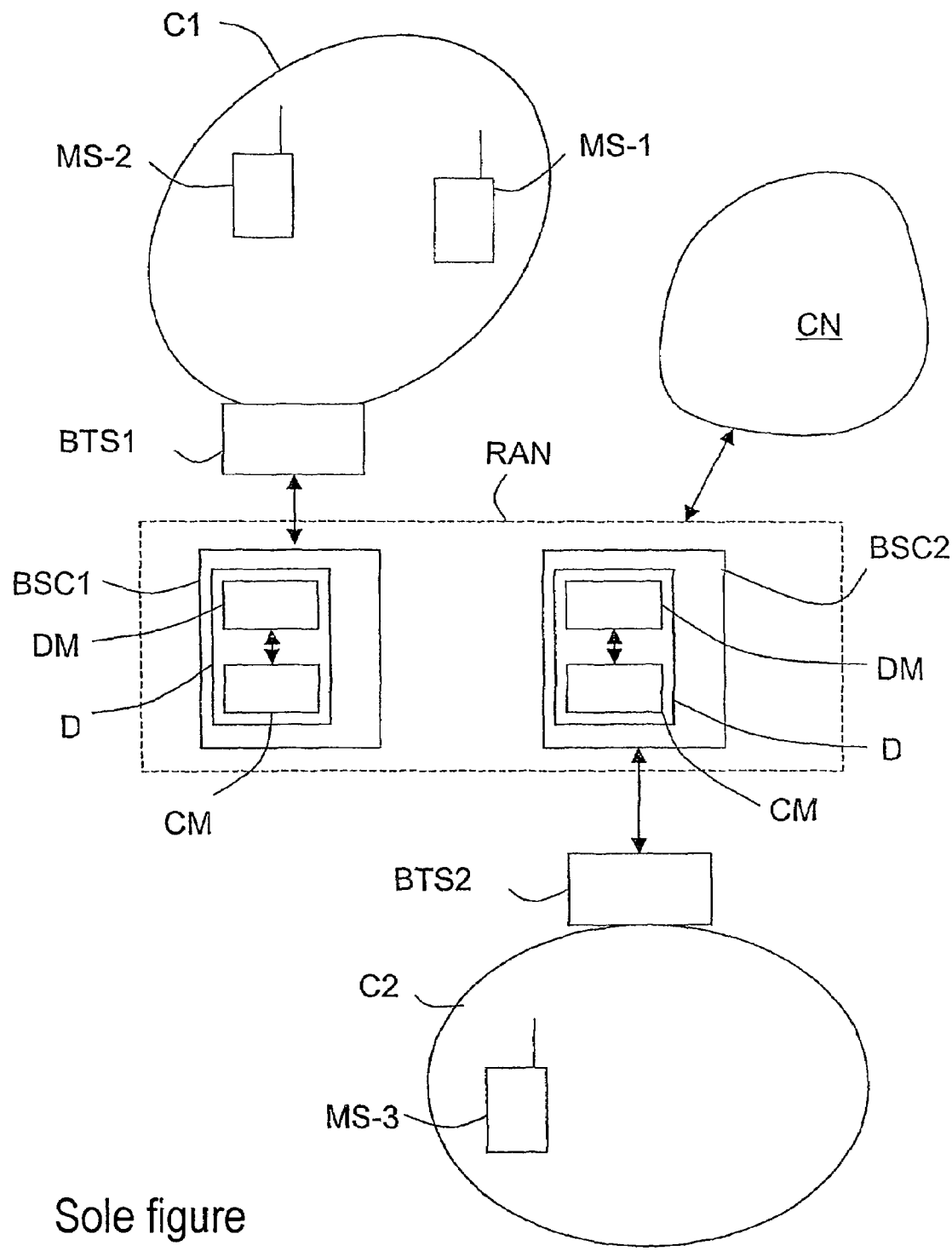
Sole figure

METHOD AND DEVICE FOR MANAGING RADIO LINK INTERRUPTION IN A RADIO COMMUNICATION SHADOW ZONE

The invention relates to the field of communications networks, and in particular to managing interruptions of the links between mobile stations (or user equipments) and a radio access network (RAN) of a communications network.

Numerous communications networks, and more particularly cellular networks, include so-called "shadow" zones in which they cannot provide radio links between the mobile stations of their subscribers and their respective radio access networks. Consequently, when a mobile station that has set up a radio link with a communications network penetrates into a shadow zone of the network, the link is momentarily interrupted. Generally, after an interruption of some selected duration, typically a few seconds, the mobile station is considered as being lost by the radio access network, and the radio resources that were previously allocated to the link by the radio access network, and more precisely by one of its nodes or radio network controllers (RNCs), are considered as being unused. In other words, the link is permanently interrupted.

In general, radio network controllers continue to transmit application data over the current radio link until they detect the absence of the mobile station. As soon as such absence is detected, data transmission is interrupted permanently, leading to the radio link being abandoned, even if the end of the selected interruption duration has not been reached.

Proposals have also been made, in patent document WO 00/33595, to arrange mobile stations in such a manner that in the event of them detecting an anomaly in their radio environment, they undertake a search to find a new radio propagation environment and request a new connection via a base station other than that previously used by the radio network controller for establishing the initial link and that has become inaccessible. That solution requires mobile stations to be modified, and given the processing time required, can prevent the initial link being reestablished if the interruption is of very short duration.

An object of the invention is thus to remedy the above-mentioned drawbacks in full or in part.

To this end, the invention provides a method of managing radio links between mobile stations (such as mobile telephones, for example), and a radio access network in a communications network, in which, in the event of interruption of the radio link between the mobile station and the radio access network being detected, the radio link is suspended (but not abandoned) and then an attempt is made to reactivate the radio link in application of a selected timetable, e.g. of the periodic type.

Preferably, an attempt at reactivating the radio link is performed each time an interruption is detected.

Also preferably, attempts at reactivating the radio links are performed in application of the selected timetable over a selected time interval, e.g. equal to a few seconds.

The invention also provides apparatus (D) for managing radio links between mobile stations and at least one radio network controller of a radio access network (RAN) in a communications network, the apparatus comprising firstly detector means capable of detecting interruptions of the radio link between a mobile station and a radio network controller, and secondly control means capable, in the event of such an interruption being detected, of ordering the radio network controller to suspend the radio link and then to attempt to reactivate said radio link in application of a selected timetable, e.g. of the periodic type.

The control means may also be arranged in such a manner as to order the radio network controller to attempt to reactivate the radio link after each detection of an interruption.

Furthermore, the control means may be arranged in such a manner as to order the radio network controller to attempt to reactivate the radio link in application of the selected timetable during a selected time interval, e.g. equal to a few seconds.

The invention also provides a radio network controller, optionally coupled to other radio access network equipment such as, for example, an RNC optionally coupled to a Node B when the network is of the universal mobile telephone system (UMTS) type, or for example a base station controller (BSC) optionally coupled to a base transceiver station (BTS) for a network of the global system for mobile telecommunications/general packet radio service (GSM/GPRS) type, and a communications network including at least one apparatus of the type described above.

The apparatus, the radio network controller, the radio access network equipment, and the method of the invention are particularly, although not exclusively, adapted to cellular communications networks, and in particular to networks of the following types: time-division multiple access (TDMA), code-division multiple access (CDMA), CDMA-One, PHE, and freedom of multimedia access (FOMA).

Other characteristics and advantages of the invention appear on examining the following detailed description and the sole accompanying FIGURE which is a diagram showing a portion of a communications network including management apparatuses of the invention. This FIGURE may serve not only to describe the invention, but may also contribute to defining it, where appropriate.

The invention relates to apparatus and a method for managing link interruptions between the radio access network and mobile stations using the network, such as mobile telephones, and in the presence of radio shadow zones. Such an apparatus and method are thus intended respectively to be installed and implemented in cellular communications networks, and in particular in public land mobile networks (PLMNs) e.g. the so-called "2G" or "2.5G" networks such as GSM/GPRS networks, or so-called "3G" networks such as the UMTS network. However the invention is not limited to such networks and applies more generally to all cellular networks, and in particular to networks of the following types: TDMA, CDMA, CDMA-One, PHS, and FOMA.

As shown in the sole FIGURE, these cellular networks can be summed up very briefly, but in a manner that is nevertheless sufficient for understanding the invention, as comprising a core network (CN) coupled to a radio access network comprising:

- a plurality of nodes (or radio network controllers) coupled to the core network via an interface. These nodes are known as base station controllers (BSCs) in networks of the GSM/GPRS type, and as radio network controllers (RNCs) in networks of the UMTS type; and
- a plurality of transceiver base stations each associated firstly with one or more cells each covering a radio zone, and secondly coupled singly or in groups to one of the nodes via a logic interface. Such base stations are referred as to BTSes for a network of the GSM/GPRS type and as Node Bs in a UMTS network.

By way of non-limiting example, the description relates to a network of the TDMA type, and more particularly of the GPRS type. Furthermore, it is considered that the mobile stations MS-i (in this case i=1 to 3) are capable of exchanging data with other network equipments, e.g. using a protocol of the wireless application protocol (WAP) type, of the short message service (SMS) type, of the extended message service (EMS) type, of the multimedia message service (MMS) type, and/or of the transport control protocol (TCP) type. Consequently, the mobile stations MS-i may be mobile telephones, personal digital assistants (PDAs), or portable computers fitted with radio interfaces, and more generally any type of mobile or roving machine fitted with a radio interface and adapted in particular to remote surveillance or remote monitoring applications, or indeed to controlling road or rail traffic. By way of illustration, it is also assumed that each base station of the RAN, in this case constituted by a BTSj (for j=1 or 2) controls a single cell Cj defining a geographical zone (referred to below as the corresponding cell Cj, for brevity). Naturally, each BTS could control a plurality of cells, and a geographical zone could be defined by a plurality of cells or cell portions. Finally, it is assumed that each BSCn (for n=1 or 2) controls a single base station BTSj.

As mentioned above, the apparatus D of the invention is designed to manage the problems that arise with link interruption when the mobile station MS-i reaches one of the radio shadow zones in a cell Cj.

Before such a situation arises, the mobile station MS-i has set up a link with another equipment of the network, e.g. via the BTSj, which manages the cell Cj in which the station is located, and via the BSCn which manages the BTSj within the RAN and which allocates a portion of the radio resources of the network.

On penetrating into a shadow zone, the mobile station MS-i is no longer in radio range of the BTSj to which it is attached, so it can no longer exchange data with the communications network. In other words, the link is subjected to an interruption.

In order to handle such interruptions, it is preferable to implant management apparatus D in each BSC of the RAN.

The management apparatus D comprises firstly a detector module DM for detecting traffic interruptions. By definition, a "traffic interruption" designates the fact that the service data and/or the data for transfer is no longer being received from a mobile station MS-i with which a link had previously been established.

The apparatus D also includes a control module CM coupled to the detector module DM and designed to intervene with the BSCn when said detector module DM warns it that an interruption has been detected.

Preferably, the detector module DM sends a message to the control module CM warning it that an interruption has been detected on each occasion that it detects a data transfer interruption having a duration of not less than some selected value Tint. On receiving this message, the control module CM sends a message to the BSC ordering it to suspend the radio link in question, and then to attempt to reactivate the radio link in application of a selected timetable.

Also preferably, attempts at reactivating the link are made in application of a timetable of periodic type. For example, the period might be equal to 1 second.

In a variant, the attempts at reactivating the link can be undertaken in application of a timetable using statistical results known for the network in question. For example, if it is considered that most interruptions have a duration of two seconds, of three seconds, or are "infinite" (i.e. interruptions that are permanent), then attempts at reactivating the link can apply the following timetable: make one attempt after an interruption of two seconds, make another attempt after three seconds, and treat the interruption as being permanent if both of those attempts are ineffective. In this variant, it is preferably the control module CM that generates the timetable on the basis of statistical results that it receives from the communications network and relating to the durations of interruptions detected by the detector module DM.

Furthermore, attempts at reactivating the radio link are preferably performed in application of a selected timetable for a selected time interval, e.g. equal to the duration RL, beyond which the break in the link is considered as being permanent by the mobile station MS-i. For a network of the GPRS type, this duration RL is equal to five seconds. Once the duration RL has elapsed, the link is considered as being permanently interrupted. The BSC is then authorized by the control module CM of the management apparatus D to allocate the radio resources to a new radio link.

By means of the invention, radio resources continue to be allocated to a link that is interrupted momentarily throughout the duration of the selected time interval, thus making it possible for the link to be reestablished instantaneously as soon as the mobile station MS-i leaves the radio shadow zone (naturally assuming that the selected time interval does not elapse). In addition, in GPRS as in CDMA, since passband is shared, it can therefore be reused throughout the duration of the interruption by other mobile stations that can still communicate. In other words, traffic is interrupted when it is known statistically that there is insufficient chance of communicating with the mobile station. Consequently, passband can be allocated to other mobile stations that can use.

As mentioned above, the apparatus D of the invention is preferably installed in each network controller BSC. Under such circumstances, it is preferably integrated in the portion of the network controller BSC in charge of controlling packet mode data transfers, i.e. in a GPRS type network in the packet control unit (PCU) function of each BSC of the network. In general, the apparatus of the invention is preferably included in the BSC if it supports the PCU function, or in other equipment if that other equipment supports the PCU function.

The control module CM and the detector module DM of the apparatus D of the invention can be implemented in the form of software modules. However they can also be implemented, at least in part, in the form of electronic circuits (hardware), or indeed in the form of combinations of software modules and of electronic circuits.

The invention also provides a method of managing momentary interruptions in radio links between mobile stations MS-i and a radio access network (RAN) of a communications network.

The method can be implemented using the apparatus described above. The main and optional functions and sub-functions implemented by the steps of the method are substantially identical to those implemented by the various means constituting the apparatus described above, and the description below merely summarizes the steps implementing the main functions of the method of the invention.

The method of the invention is performed in the RAN, e.g. in at least one of its radio network controllers (e.g. the BSCs), and consists in observing the data it receives from a mobile station (via a base station BTS), representative of the state of the radio link between the mobile station and the RAN, so that in the event of an interruption in said radio link being detected, the radio link is suspended, and then attempts are made to reactivate the radio link as a function of a selected timetable, e.g. of periodic type.

The invention is not limited to the embodiments of the apparatus, the radio network equipment, the base station, and the radio network controller or to the implementation of the method described above merely by way of example, but covers any variant that the person skilled in the art can devise in the ambit of the following claims.

The invention claimed is:

1. A method of managing radio links between at least one mobile station and a radio access network of a communications network, the method comprising:
   detecting whether a radio link interruption occurs which prevents said mobile station and said radio network controller from communicating with each other via a radio link;
   in the event of an interruption being detected in the radio link between said mobile station and said radio access network, suspending said radio link and attempting to reactivate said radio link for a predetermined time interval; and
   if said radio link is not reactivated within the predetermined time interval, determining that said interruption is permanent.

2. The method according to claim 1, wherein an attempt is made to reactivate said radio link after each detection of an interruption.

3. The method according to claim 1, wherein attempts are made to reactivate said radio link in application of a selected timetable over said predetermined time interval.

4. The method according to claim 3, wherein said timetable is of the periodic type.

5. The method according to claim 3, wherein said timetable is drawn up on the basis of statistical results obtained in said communications network and relating to the durations of said detected interruptions.

6. An apparatus for managing radio links between at least one mobile station and a radio network controller of a radio access network of a communications network, the apparatus comprising:
   detector means arranged to detect a radio link interruption which prevents said mobile station and said radio network controller from communicating with each other via a radio link; and
   control means arranged, in the event of said interruption being detected, to order said radio network controller to suspend said radio link, and then to attempt to reactivate said radio link for a predetermined time interval, and determine that said interruption is permanent if said radio link is not reactivated within said predetermined time interval.

7. The apparatus according to claim 6, wherein said control means are arranged to order said radio network controller to attempt to reactivate said radio link after each detection of an interruption signaled by said detector means.

8. The apparatus according to claim 6, wherein said control means are arranged to order said radio network controller to attempt to reactivate said radio link in application of a selected timetable during said predetermined time interval.

9. The apparatus according to claim 8, wherein said timetable is of the periodic type.

10. The apparatus according to claim 8, wherein said control means are arranged to draw up said timetable on the basis of statistical results obtained in said communications network and relating to the durations of said interruptions detected by said detector means.

11. A radio network controller of a radio access network of a communications network, the controller comprising an apparatus for managing radio links between at least one mobile station and the radio network controller, the apparatus comprising detector means arranged to detect a radio link interruption which prevents a mobile station and said radio network controller from communicating with each other via a radio link, and control means arranged, in the event of said interruption being detected, to order said radio network controller to suspend said radio link, and then to attempt to reactivate said radio link for a predetermined time interval, and determine that said interruption is permanent if said radio link is not reactivated within said predetermined time interval.

12. Equipment for a radio access network of a communications network including at least one radio network controller, the equipment comprising an apparatus for managing radio links between at least one mobile station and the radio network controller, the apparatus comprising detector means arranged to detect a radio link interruption which prevents a mobile station and said radio network controller from communicating with each other via a radio link, and control means arranged, in the event of said interruption being detected, to order said radio network controller to suspend said radio link, and then to attempt to reactivate said radio link for a predetermined time interval, and determine that said interruption is permanent if said radio link is not reactivated within said predetermined time interval.

13. A communications network comprising a radio access network (RAN) including at least one radio network controller (BSCn), and at least one apparatus for managing radio links between at least one mobile station and the radio network controller, the apparatus comprising detector means arranged to detect a radio link interruption which prevents a mobile station and said radio network controller from communicating with each other via a radio link, and control means arranged, in the event of said interruption being detected, to order said radio network controller to suspend said radio link, and then to attempt to reactivate said radio link for a predetermined time interval, and determine that said interruption is permanent if said radio link is not reactivated within said predetermined time interval.

* * * * *